W. H. COLLINS AND F. R. BAUKHAGE.
SAFETY SIGNAL FOR MOTOR VEHICLES.
APPLICATION FILED JUNE 4, 1920.
1,387,355. Patented Aug. 9, 1921.
2 SHEETS—SHEET 2.
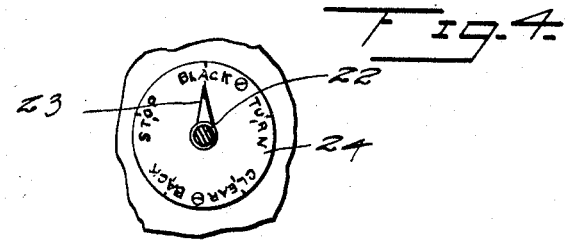
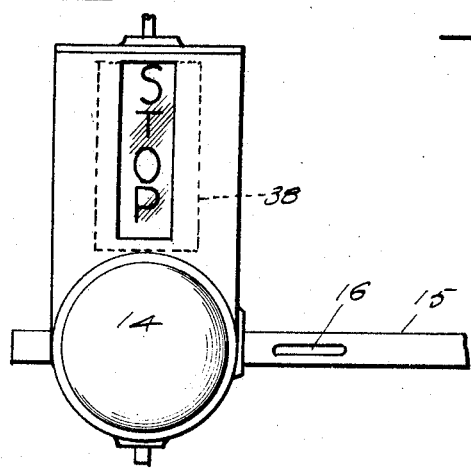
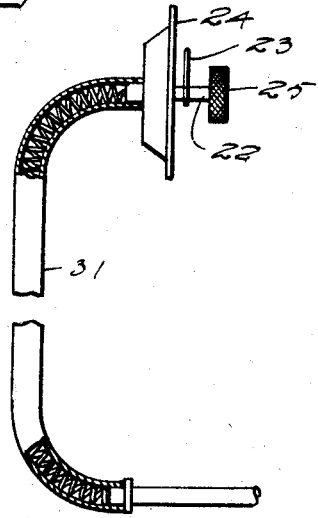
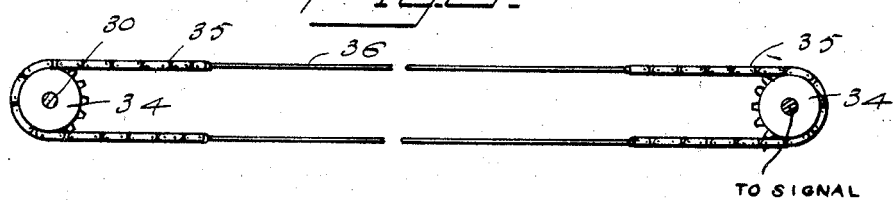
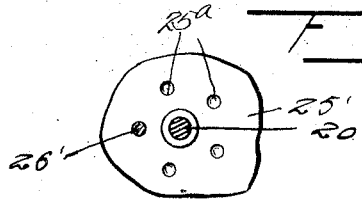
Inventor
W.H.Collins
F.R.Baukhage
By
Attorney

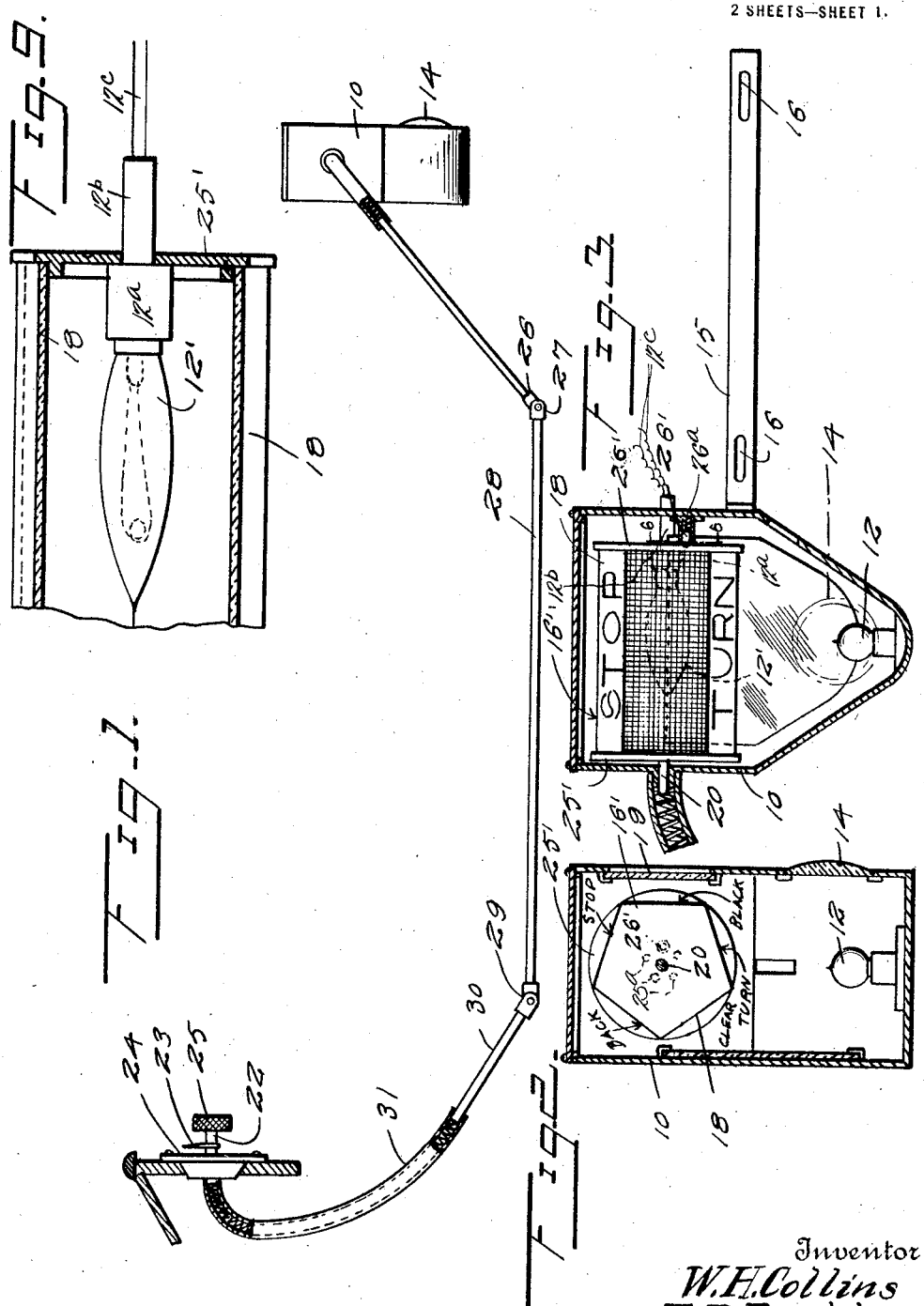

UNITED STATES PATENT OFFICE.

WILLIAM H. COLLINS AND FREDERICK R. BAUKHAGE, OF DANVILLE, ILLINOIS.

SAFETY-SIGNAL FOR MOTOR-VEHICLES.

1,387,355.   Specification of Letters Patent.   Patented Aug. 9, 1921.

Application filed June 4, 1920. Serial No. 386,461.

*To all whom it may concern:*

Be it known that we, WILLIAM H. COLLINS and FREDERICK R. BAUKHAGE, citizens of the United States, residing at Danville, in the county of Vermilion and State of Illinois, have invented certain new and useful Improvements in Safety-Signals for Motor-Vehicles; and we do hereby declare the following to be a full, clear, and exact description of the invention, such as will enable others skilled in the art to which it appertains to make and use the same.

This invention relates to a safety signal for motor vehicles, and the object is to provide in connection with the usual rear light for a vehicle of the type indicated, a rotatable signal element which may be controlled from the dash board of the car and by means of which the driver may indicate the course of travel.

A further object is to provide a signal which shall include a continuously operated rear light or tail light, and a rotatable element carrying different designations, such as, back, stop, turn, etc., with means for imparting rotary movement to the signal element, and illuminating means therefor.

A still further object is to provide a signal of the type indicated, which shall include a casing in one portion of which a lamp is mounted for providing the usual rear signal, and in which there is mounted a rotatable device, which may be supported either in a horizontal, or in a vertical position, this device having a plurality of faces each carrying a particular designation, or several of such faces carrying a particular designation, such as stop, turn, etc.

A still further object is to provide a signal of the character indicated, with a flexible mechanical connection by means of which the signal may be operated from the dash board of the car.

With the foregoing and other objects in view, the invention consists in its novel construction, combination, and arrangement of elements hereinafter described and claimed.

In the accompanying drawings:

Figure 1 is a view more or less diagrammatic showing the casing of the rear signal, the controlling device for mounting on the dash-board of the car, and the flexible connecting elements.

Fig. 2 is a vertical section through the casing of the indicating device.

Fig. 3 is a vertical section from another angle.

Fig. 4 is a front view of the controlling device mounted on the dash board.

Fig. 5 is a view in elevation of a form in which the rotatable element is mounted for movement on a vertical axis.

Fig. 6 is a detail of construction described below.

Figs. 7 and 8 show other types of flexible connections.

Fig. 9 is a detail longitudinal sectional view through the signaling drum illustrating the mounting of the lamp therein.

In carrying out our invention we employ a casing designated 10 which may be of any suitable configuration, and mount therein a lamp 12 adapted to serve for the permanent rear signal, this lamp having associated therewith the lens 14, which will usually be colored red. Connected with the casing may be a bar 15 provided with slots 16 for mounting the license plate.

While the relative arrangement of the indicating device and the usual rear signal is not important, we have shown the rotatable element mounted above the lamp 12. This rotatable element is designated at 16' and may have any suitable number of sides. Five sides are shown in the drawings, and certain of these will carry the designations back, stop, turn, etc., while the transparent element 18 on one side may be clear, and one side may be colored black. A clear plate or lens 19 is mounted in front of the rotatable element.

An electric lamp 12' is located in the rotatable element and is carried by a socket 12$^a$ which is secured to one end of said rotatable element. One of the spindles that supports the rotatable element as at 12$^b$ is of hollow formation so that the electric feed wires 12$^c$ may extend into the rotatable element for connection to the socket. The electric lamp 12' is adapted to illuminate the various characters or signals and to furnish illuminating means, serve as a spot light when the clear side of the rotating element is positioned in alinement with the lens 19. The light rays from the electric lamp 12' are normally concealed from view through the lens 19 by the black side of the rotating element which normally occupies a position in alinement with the panel 19 and when the signal is in non-signaling position.

The mounting means includes a spindle 20 projecting through the casing and having connection with a controlling device which is preferably mounted on the dash board. This controlling device includes a stem or spindle 22 provided with a pointer 23 cooperating with the dial plate 24, the stem being provided with a knob or milled head 25 by means of which it may be operated. The dial plate carries designations corresponding with those on the rotatable indicating device.

When the clear plate of the rotatable element is opposite the clear lens or plate just mentioned, the device serves as a spot light. One of the metallic end plates 25' of the rotatable device is provided with notches 25ª, and a slidable pawl 26' normally urged toward the rotatable element by an expansive spring 26ª engages the notches and prevents rotation after adjustment is secured.

It is obvious that the indicating device may be rotated in any suitable manner, but in the drawing we have shown flexible mechanical means for effecting this result. The spindle 20 has connection with one element 26 of a universal joint, the other element 27 thereof being connected with the shaft 28, which in turn is connected by a universal joint 29 with the shaft section 30. Between the latter and the stem of the controlling device on the dash-board, we also provide a flexible connection, such as that shown at 31 in Fig. 1, but may also use a universal joint at this point, if the angle between the rotatable element is such that a joint of this character will serve the purpose.

It is further clear that a chain and sprocket wheel connection, such as that shown in Fig. 8, will accomplish the purpose. In this view one of the sprocket wheels is designated 34, the associated sprocket chain is shown at 35, and the wire connection with the element to be rotated is designated at 36.

In Fig. 5 we have shown the rotatable element mounted in a vertical position, and therefore moving on a vertical axis. The rotatable element is designated 38, and the lettering thereon is of the form shown. In this instance the spindle for driving the rotatable element may project from the top of the casing, or the spindle may be geared to a horizontal shaft section.

What we claim is:—

1. A device of the class described having a casing, a signal drum movably mounted therein, means operable to move the drum to give different signals, and automatically operable detent means for the drum within the casing associated with an end of the drum and the adjacent wall of the casing.

2. A device of the class described having a casing, a signal drum therein, means as a socket to journal the drum to the casing, a lamp in the drum having said means, detent means to prohibit undue movement of the drum along the said means and secure the drum in different positions including a spring, and means to rotate the drum toward the last means.

3. A device of the class described having a casing, a signal lamp therein, the casing being enlarged above the lamp and containing a signal drum, means as a socket to journal the drum to the casing, a lamp in the drum having said means, spring detent means to prohibit undue movement of the drum along the said means and secure the drum in different positions, means to rotate the drum and said spring detent means urging the drum toward the last means.

In testimony whereof we affix our signatures in presence of two witnesses.

WILLIAM H. COLLINS.
FREDERICK R. BAUKHAGE.

Witnesses:
C. A. NEIGHBOUR,
ED KOEPKE.